United States Patent [19]

Sundahl

[11] Patent Number: 4,607,395
[45] Date of Patent: Aug. 19, 1986

[54] HELMET RADIO CONTROL PACKAGE

[75] Inventor: James G. Sundahl, Irvine, Calif.

[73] Assignee: Bell Helmets Inc., Norwalk, Calif.

[21] Appl. No.: 577,588

[22] Filed: Feb. 6, 1984

[51] Int. Cl.⁴ .......................... H04B 1/08; H04B 1/38; H01C 10/32; F16H 35/18
[52] U.S. Cl. .................................... 455/351; 74/10.6; 338/163; 455/89; 455/90; 455/100
[58] Field of Search .................... 455/351, 89, 90, 95, 455/100; 338/68, 163, 164, 199, 160; 179/156 R, 182 R, 182 A; 381/86, 109; 74/55, 10.6

[56] References Cited

U.S. PATENT DOCUMENTS

| | | | |
|---|---|---|---|
| 3,309,690 | 3/1967 | Moffitt | 455/351 |
| 3,586,977 | 6/1971 | Lustig | 455/351 |
| 4,130,803 | 12/1978 | Thompson | 455/351 |

OTHER PUBLICATIONS

Hill; *Popular Science;* "Helmet Radio: For Rappin' on the Road"; p. 32; Mar. 1974.

Primary Examiner—Marc E. Bookbinder
Assistant Examiner—Andrew Telesz
Attorney, Agent, or Firm—William W. Haefliger

[57] ABSTRACT

A radio attachable to a cyclist's helmet comprises:
 (a) a receptacle having a generally annular side wall and a bottom wall, the receptacle attachable to a helmet surface with said bottom wall facing said surface,
 (b) radio circuitry within the receptacle, and
 (c) a large radio control knob fitted to the receptacle and rotatable thereon, to control said circuitry, whereby the cyclist may manually reach to the vicinity of his helmet to turn said knob.

9 Claims, 10 Drawing Figures

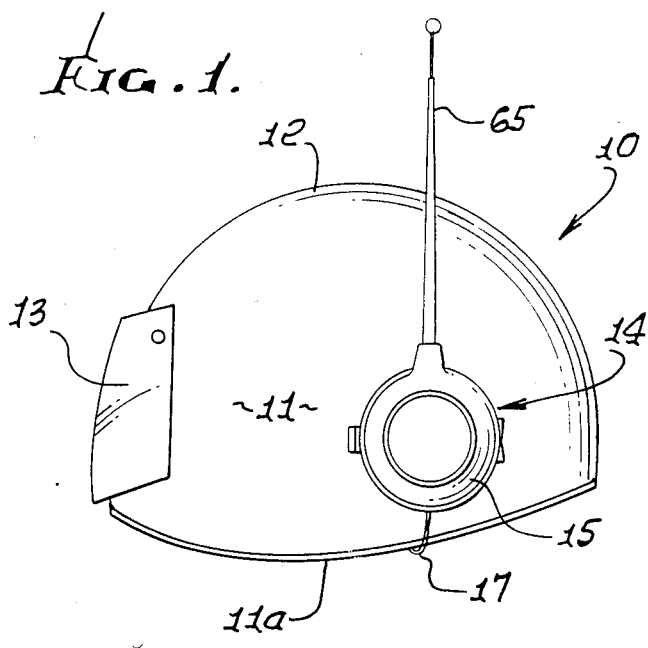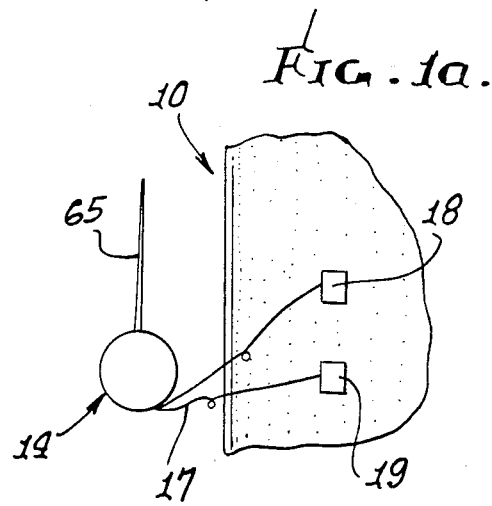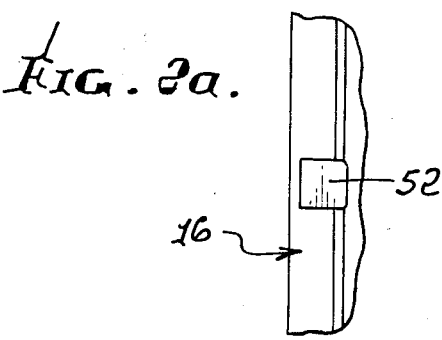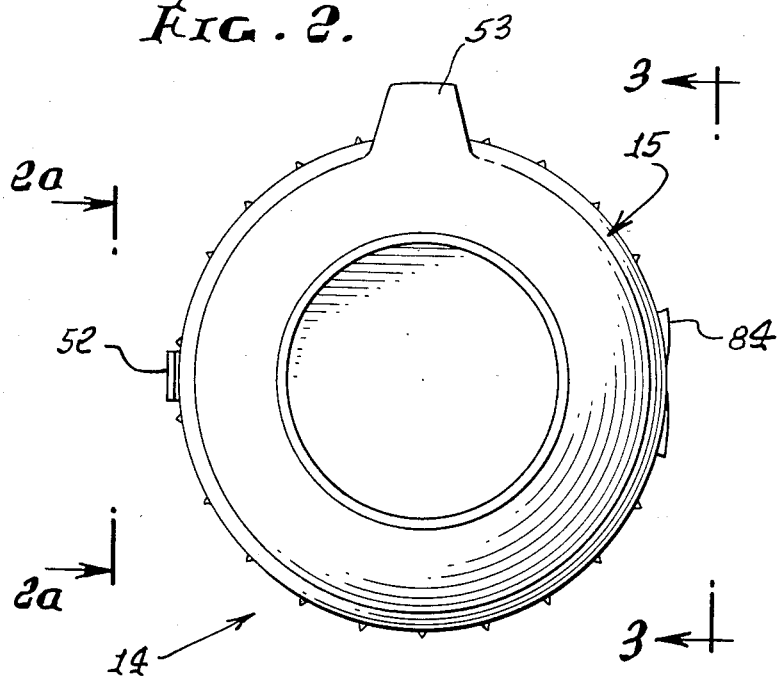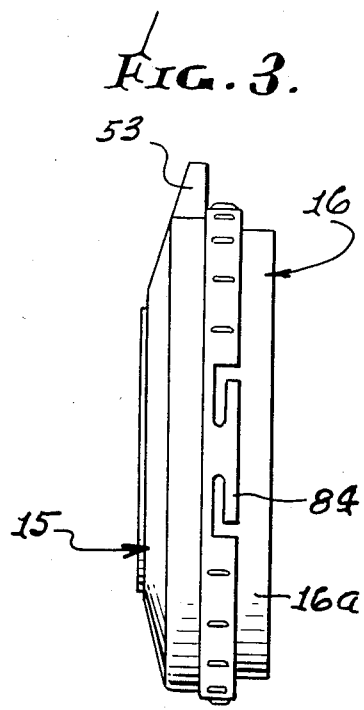

HELMET RADIO CONTROL PACKAGE

BACKGROUND OF THE INVENTION

This invention relates generally to control of radios associated with cyclists' helmets; more specifically it concerns control of a radio at the rear of the helmet.

There is need for easily controllable radios associated with cyclists' helmets to facilitate two-way communication, and without interferring with cyclists' arm movements. Such interference would unduly endanger cyclists, traveling at high speeds.

SUMMARY OF THE INVENTION

It is a major object of the invention to provide a radio meeting the above need. Basically, the invention comprises a radio attachable to a cyclist's helmet, at a rearward, external and accessible location, and characterized by (a) a receptacle having a generally annular side wall and a bottom wall, the receptacle attachable to a helmet surface with said bottom wall facing said surface, (b) radio circuitry within the receptacle, and (c) a large radio control knob fitted to the receptacle and rotatable thereon, to control said circuitry, whereby the cyclist may manually reach to the vicinity of his helmet to turn said knob.

As will appear, the radio is attachable to the rear convex side of the helmet by means, as for example a plastic foam cushion isolating the radio from shocks to the helmet, or an adhesive layer enabling removal of the radio, when desired. Also, the large knob may be rotatable in either direction to control the radio, so that either left or right hands of the cyclist, typically mitted or gloved, may be employed to rotate the large knob at the rear of the helmet. A track or track section on the knob is employed to displace an impedance adjusting component for the radio, and in such manner as to allow knob rotation in either direction, and knob removal in a pre-determined position, for access to the radio battery.

These and other objects and advantages of the invention, as well as the details of an illustrative embodiment, will be more fully understood from the following description and drawings, in which:

DRAWING DESCRIPTION

FIG. 1 is a rear elevational view of a helmet with a radio and control, attached;

FIG. 1a is a schematic view;

FIG. 2 is an enlarged frontal elevational view of the radio and control; and 2a is taken on lines 2a—2a;

FIG. 3 is a side elevational knob on lines 3—3 of FIG. 2

DETAILED DESCRIPTION

Figure 5:
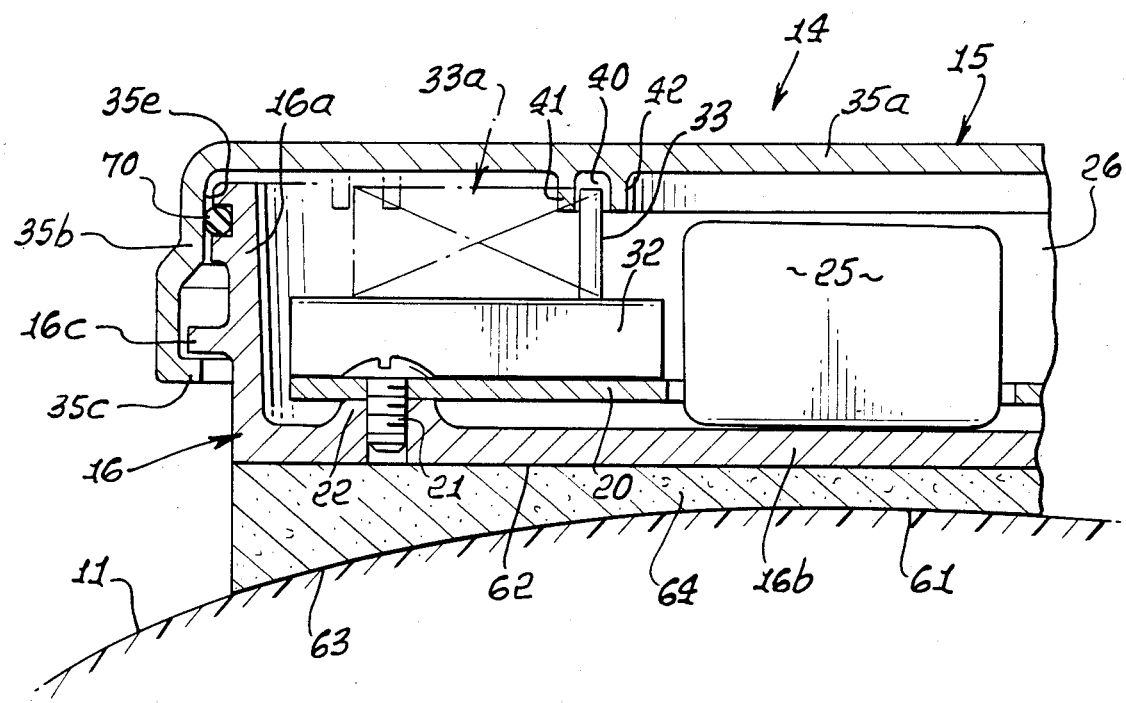
FIG. 5 is an enlarged fragmentary sectional showing of interior details.

Referring first to FIG. 1, a cyclist's helmet 10 has a rear wall or surface 11 that is convexly curved. See also FIG. 5 showing such curvature. The domed top of the helmet appear at 12, and the front transparent window at 13. Attached to rear surface 11 is a two-way radio 14, having a large control knob 15 which the cyclist may rotate, as by reaching back with one hand, to control the radio (volume or amplification, for example). Thus, the radio is not in a position of mechanically interferring with the cyclist's arm movement in controlling his bicycle or motorcycle. An antenna 65 extends upwardly from the radio receptacle 16, and speaker and microphone wiring extends at 17 from the bottom of the receptacle downwardly to the lower edge 11a of the helmet wall 11. Such wiring thereby enters the helmet to speaker 18 and microphone 19 units carried by the helmet near the cyclist's ear and mouth regions. FIG. 1a shows the organization, the radio is typically an FM unit. FIG. 1a schematically shows speaker and microphone units 18 and 19.

Figure 4:
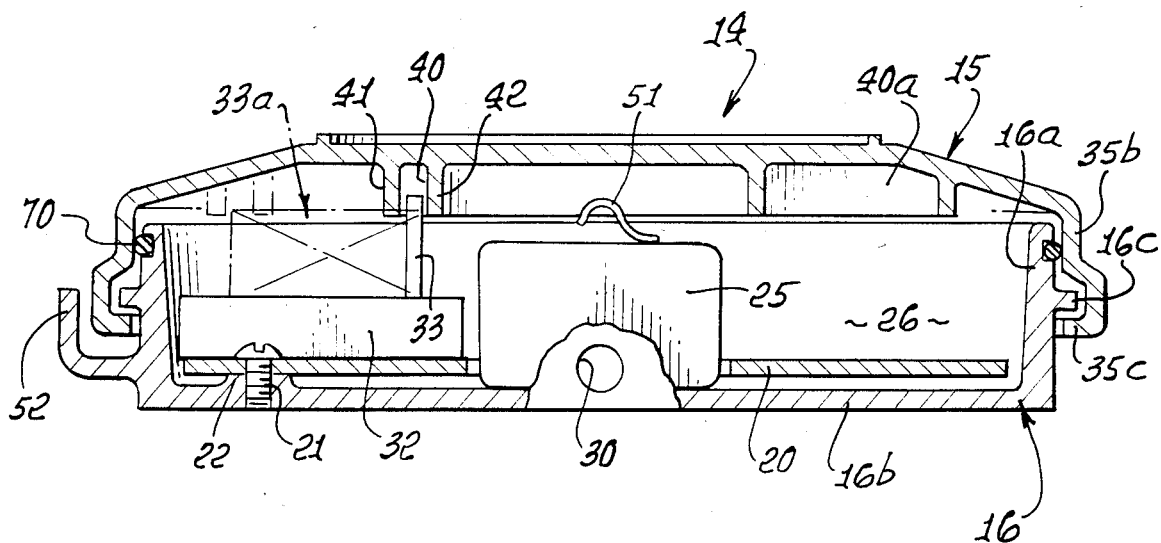
FIG. 4 is a section through the radio and control.
Figure 7:
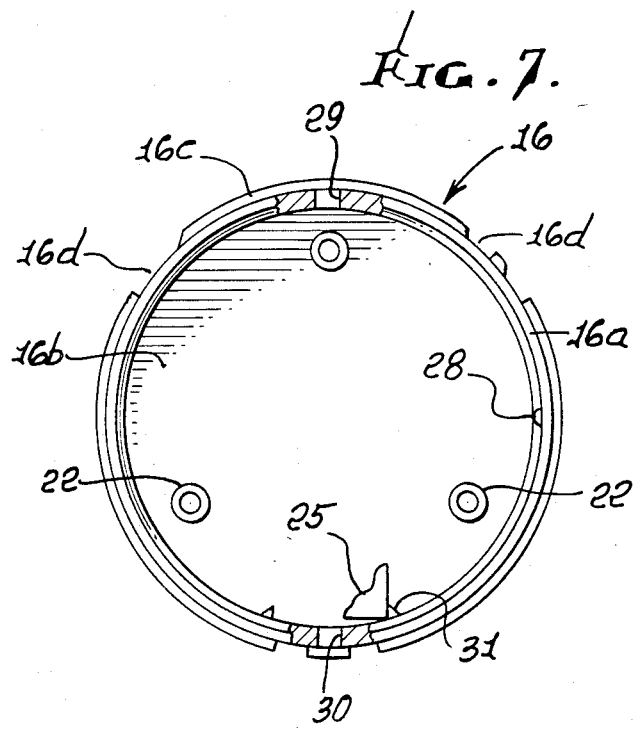
FIG. 7 is a plan view of a structure within the case.
Figure 8:
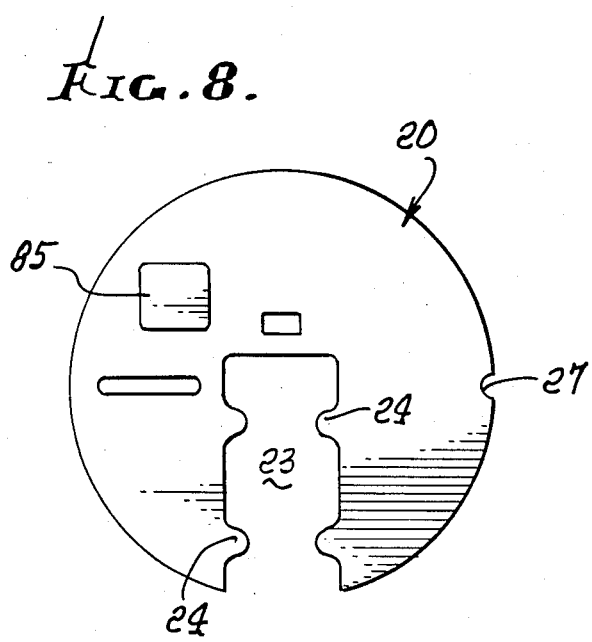
FIG. 8 is a plan view of a printed circuit board.

Extending the description to FIGS. 3-5, the radio unit 14 comprises a receptacle 16 having a generally annular side wall 16a and a base or bottom wall 16b facing toward and attachable to the helmet wall surface 11. Radio circuitry is typically carried on a printed circuit (PC) board 20 located within the receptacle, as indicated. Self tapping or other fasteners 21 attach the board to bosses 22 integral with wall 16b. FIG. 8 shows the circular outline board 20 as having a cut-out region 23 to receive a 9-volt battery (power supply for the radio). Tabs 24 are provided on the board, or on a clip associated with the board, to hold the battery 25 in position. The board fits within the interior 26 of the receptacle, a notch 27 in the bond edge registering with a lug 28 in receptacle wall 16a as in FIG. 7. Note hole 29 in wall 16a to pass the antenna, and hole 30 in that wall to pass wiring 17. Battery holding notches appear at 31. The board may also carry an adjustable component (for example, adjustable impedance, one example being a resistor). See for example the potentiometer slide or wire 32.

Another component, as for example wiper arm 33, is movable generally radially relative to the slide 32, and through a radial range indicated by broken lines 33a to vary the impedance, as for example the resistance of the potentiometer, for volume control of radio reception, for example.

The wiper position is controlled as by a large control knob 15 fitted to the receptacle and rotatable thereon, as by one handed manipulation of the cyclist, as he reaches to the backside of his helmet. The illustrated knob has an outer wall 35a, and annular skirt 35b extending telescopically relative to receptacle wall 16a. The skirt has sector shaped lips 35c underlapping flange 16c or wall 16a, to retain the knob to the receptacle; however, when the knob has been rotated to register lips 35c with notches 16d in flange 16c, the knob is removable off the receptacle, to provide access to the battery, for replacement.

Figure 6:
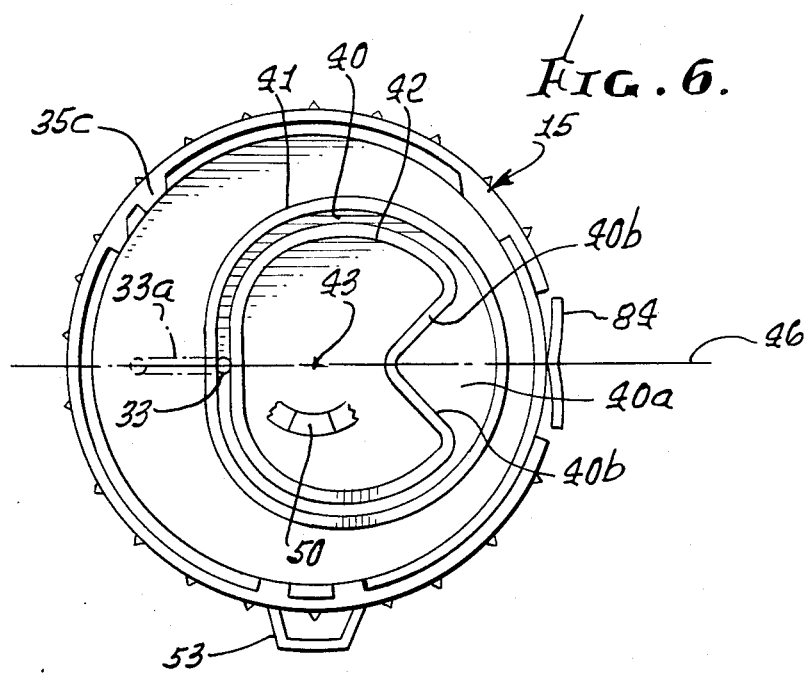
FIG. 6 is a plan view of control structure within the control knob.

FIG. 6 shows a track 40 provided between flanges 41 and 42 integral with the knob. The radial distance of the track from the axis of rotation 43 varies about that axis, as shown, whereby as the knob is rotated, the arm 33 received in the track is displaced radially, to vary the resistance, as described.

The track is shown to have like sections, at opposite sides of a diameter line 46, whereby the arm 33 is shifted radially an amount which is the same for the same extents of clockwise or a counterclockwise knob rotation. When the arm is in radially widened track region 40a, it may have any of a number of radial positions, accommodating removal and replacement of the knob, as described; however, as the knob is then rotated, the inner flange extent 40b causes the arm to enter the narrow track region associated with controlled radial displacement of the arm, as described. Silicone grease may be provided in the track, to facilitate arm sliding. Arm 33 moves radially in a guide in pot 32.

An ON-OFF cam 50 on the knob is adapted to engage an ON-OFF switch 51 in the receptacle, and carried on PC board 20, to activate the radio as the knob is rotated in either direction from a centered position in which the arm 33 is diametrically opposite the widened track region 40a.

Note also the stop lug 52 on the receptacle which is engageable by the lug 53 on the knob when the knob is in removable position.

A means is associated with the receptacle and via which the receptacle is attachable to the helmet surface. FIG. 5 shows, for example, a cushion layer 64 (foam plastic such as polyurethane) attached at 61 to the helmet along curved surface 11. An adhesive layer 62 may join the bottom wall 16b to the layer 64; or an adhesive layer 63 may join the layer 64 to the helmet surface.

O-ring 70 on receptacle wall 16a engages the inner side 35e of the knob wall 35b to provide friction holding the knob in a selected position relative to the receptacle. See FIG. 5.

Latch 84 on the knob may be depressed into notches 16d to block knob rotation, if desired.

Numeral 85 in FIG. 8 indicates circuitry on board 20.

I claim:

1. In a radio attachable to a cyclist's helmet, the combination comprising
   (a) a receptacle having a generally annular side wall and a bottom wall, the receptacle attachable to a helmet surface with said bottom wall facing said surface,
   (b) radio circuitry within the receptacle, and
   (c) a large radio control knob fitted to the receptacle and rotatable thereon, to control said circuitry whereby the cyclist may manually reach to the vicinity of his helmet to turn said knob,
   (d) said radio circuitry comprising FM circuitry having an adjustable component for controlling the power level of FM transmission, said knob operatively connected with said component to adjust same as the knob is rotated,
   (e) the knob having two track sections, which are circularly spaced about an axis of rotation defined by the knob, one section controllably adjusting said component when the knob is rotated clockwise, and the other section controllably adjusting said component when the knob is rotated counterclockwise.

2. The combination of claim 1 wherein said sections are generally symmetrical.

3. The combination of claim 1 including a radio circuitry ON-OFF control activated to ON condition when the knob is rotated either clockwise or counterclockwise from a center position.

4. The combination of claim 1 wherein said track sections merge at a radially widened track portion to receive a component arm in a range of radial positions, and corresponding to a removal position of the knob off the receptacle, the track having camming surfaces to cam said arm into narrowed track region as the knob is rotated.

5. The combination of claim 1 including an antenna electrically connected to said circuitry, and carried by the receptacle outside the helmet, whereby the receptacle, knob and antenna may be removed as a unit from the helmet.

6. The combination of claim 1 including a cushion layer extending proximate said receptacle bottom wall and having a concave side to approximately fit a convex contour of the helmet surface.

7. The combination of claim 1 including an adhesive layer associated with said receptacle bottom wall.

8. The combination of any one of claims 5, 6 and 7 including said helmet to which the radio is attached.

9. The combination of claim 5 wherein said component comprises a potentiometer.

* * * * *